(12) United States Patent
Shao et al.

(10) Patent No.: US 11,818,066 B2
(45) Date of Patent: Nov. 14, 2023

(54) METHOD AND APPARATUS FOR SENDING SRS

(71) Applicant: HUAWEI TECHNOLOGIES CO., LTD., Guangdong (CN)

(72) Inventors: Jiafeng Shao, Beijing (CN); Yongxia Lyu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 471 days.

(21) Appl. No.: 17/172,598

(22) Filed: Feb. 10, 2021

(65) Prior Publication Data

US 2021/0167923 A1 Jun. 3, 2021

Related U.S. Application Data

(63) Continuation of application No. PCT/CN2019/099710, filed on Aug. 8, 2019.

(30) Foreign Application Priority Data

Aug. 10, 2018 (CN) .......................... 201810912170.5

(51) Int. Cl.
| | | |
|---|---|---|
| *H04L 5/00* | (2006.01) | |
| *H04L 1/00* | (2006.01) | |
| *H04L 1/1812* | (2023.01) | |
| *H04W 72/23* | (2023.01) | |

(52) U.S. Cl.
CPC .......... *H04L 5/0051* (2013.01); *H04L 1/0003* (2013.01); *H04L 1/1812* (2013.01); *H04L 5/0094* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2012/0281566 | A1* | 11/2012 | Pelletier | H04W 76/27 370/252 |
| 2013/0077574 | A1* | 3/2013 | Ekpenyong | H04L 5/0085 370/329 |
| 2013/0242958 | A1 | 9/2013 | Dinan | |

(Continued)

FOREIGN PATENT DOCUMENTS

| | | |
|---|---|---|
| CN | 101335969 A | 12/2008 |
| CN | 101932108 A | 12/2010 |

(Continued)

OTHER PUBLICATIONS

Extended European Search Report issued in European Application No. 19846622.9 dated Aug. 11, 2021, 15 pages.

(Continued)

*Primary Examiner* — Anh Vu H Ly
(74) *Attorney, Agent, or Firm* — Fish & Richardson P.C.

(57) ABSTRACT

This application provides a method and an apparatus for sending an SRS. When receiving first indication information indicating to send an SRS, a terminal device may determine a first time interval in a plurality of candidate first time intervals, where the first time interval is used to determine whether the first indication information is valid, and the terminal device may send the SRS based on the first time interval.

18 Claims, 4 Drawing Sheets

(56) References Cited

U.S. PATENT DOCUMENTS

| | | | |
|---|---|---|---|
| 2015/0110017 A1* | 4/2015 | Park | H04L 5/0055 |
| | | | 370/329 |
| 2016/0285716 A1* | 9/2016 | Pelletier | H04W 74/0833 |
| 2017/0013565 A1* | 1/2017 | Pelletier | H04W 52/367 |
| 2017/0302419 A1* | 10/2017 | Liu | H04L 5/0091 |
| 2017/0366311 A1 | 12/2017 | Iyer et al. | |
| 2017/0367046 A1 | 12/2017 | Papasakellariou | |
| 2018/0014301 A1 | 1/2018 | Chen et al. | |
| 2018/0098342 A1 | 4/2018 | Jiang et al. | |
| 2019/0150170 A1* | 5/2019 | Park | H04W 74/08 |
| | | | 370/329 |
| 2019/0320469 A1* | 10/2019 | Huang | H04W 72/23 |
| 2020/0068605 A1* | 2/2020 | Golitschek Edler von Elbwart | |
| | | | H04W 72/23 |

FOREIGN PATENT DOCUMENTS

| | | |
|---|---|---|
| CN | 102142871 A | 8/2011 |
| CN | 102158964 A | 8/2011 |
| CN | 103796291 A | 5/2014 |
| CN | 104737489 A | 6/2015 |
| CN | 105191185 A | 12/2015 |
| CN | 107370585 A | 11/2017 |
| CN | 107370589 A | 11/2017 |
| CN | 107846731 A | 3/2018 |
| EP | 2779514 A2 | 9/2014 |
| WO | 2018064313 A1 | 4/2018 |

OTHER PUBLICATIONS

Huawei, HiSilicon, "MCS and CQI design for URLLC," 3GPP TSG RAN WGI Meeting #93, R1-1805898, Busan, Korea, May 21-25, 2018, 8 pages.

Huawei et al., "Common aspects for TDD NB-IoT," 3GPP TSG RAN WG1 Meeting #93, R1-1805969, Busan, Korea, May 21-25, 2018, 6 pages.

3GPP TS 38.214 V15.1.0 (Mar. 2018), "3rd Generation Partnership Project; Technical Specification Group Radio Access Network; NR; Physical layer procedures for data (Release 15)," Mar. 2018, 77 pages.

LG Electronics, "Summary of TDD Common aspects," 3GPP TSG RAN WG1 Meeting #93, R1-1807563, Busan, Korea, May 21-25, 2018, 22 pages.

Office Action in Chinese Application No. 201810912170.5, dated Jun. 3, 2020, 12 pages.

PCT International Search Report and Written Opinion in International Application No. PCT/CN2019/099710, dated Oct. 28, 2019, 15 pages.

* cited by examiner

METHOD AND APPARATUS FOR SENDING SRS

CROSS-REFERENCE TO RELATED APPLICATIONS

This application is a continuation of International Application No. PCT/CN2019/099710, filed on Aug. 8, 2019, which claims priority to Chinese Patent Application No. 201810912170.5, filed on Aug. 10, 2018. The disclosures of the aforementioned applications are hereby incorporated by reference in their entireties.

TECHNICAL FIELD

This application relates to the communications field, and in particular, to a method and an apparatus for sending a sounding reference signal (SRS).

BACKGROUND

In a communications system, a terminal device needs to periodically or aperiodically send an SRS to a network device. The SRS is used by the network device to measure channel quality of an uplink channel. For example, the network device may obtain the uplink channel quality by measuring the SRS sent by the terminal device. The network device may allocate a corresponding uplink transmission resource to the terminal device based on the SRS sent by the terminal device. In a time division duplex (TDD) system, because uplink and downlink information are sent in a same frequency band, the network device may also obtain downlink channel quality by using the SRS. The network device may also allocate a corresponding downlink transmission resource to the terminal device based on the SRS sent by the terminal device. Therefore, the SRS is particularly important in the TDD system.

However, when the SRS is not sent by the terminal device in time, the network device cannot obtain accurate information about current channel quality, and then cannot accurately allocate a resource. Consequently, resource usage efficiency and communication efficiency are affected.

SUMMARY

This application provides a communications method and apparatus for sending an SRS, to improve communication efficiency.

According to a first aspect, a method for sending an SRS is provided. The method may be performed by a terminal device, or may be performed by a chip applied to a terminal device. The method includes: receiving downlink control information (DCI) on a physical downlink control channel (PDCCH), where the DCI includes first indication information, and the first indication information is used to trigger the terminal device to send an SRS; and determining, based on the DCI and/or higher layer signaling, a first time interval in a plurality of candidate first time intervals corresponding to a first subcarrier spacing, where the first time interval is used to determine whether the first indication information is valid; the first subcarrier spacing is one of the following plurality of subcarrier spacings; a 15 kilohertz (kHz) subcarrier spacing, a 30 kHz subcarrier spacing, a 60 kHz subcarrier spacing, and a 120 kHz subcarrier spacing; and a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols.

In a possible implementation, the method further includes: when a time interval between the last symbol of the PDCCH and the first symbol in which the SRS is located is greater than or equal to the first time interval, determining that the first indication information is valid, or when a time interval between the last symbol of the PDCCH and the first symbol in which the SRS is located is less than the first time interval, determining that the first indication information is invalid.

In a possible implementation, the first time interval meets the following condition the first time interval is less than or equal to a time interval between the last symbol of a physical downlink shared channel (PDSCH) indicated by the DCI and the first symbol of a first uplink channel, where the first uplink channel is used to carry hybrid automatic repeat request (HARQ) feedback information corresponding to the PDSCH indicated by the DCI; or the first time interval corresponding to the first subcarrier spacing is less than or equal to a time interval between the last symbol of the PDCCH and the first symbol of a first uplink channel, where the first uplink channel is used to carry a physical uplink shared channel PUSCH indicated by the DCI.

In a possible implementation, the first subcarrier spacing is a smaller value of a subcarrier spacing corresponding to the PDCCH and a subcarrier spacing corresponding to the SRS.

In a possible implementation, the determining, based on the DCI and/or higher layer signaling, a first time interval in a plurality of candidate first time intervals corresponding to a first subcarrier spacing includes: determining the first time interval when at least one of the following conditions is met: a time interval between a slot in which the physical uplink shared channel (PUSCH) indicated by the DCI is located and a slot in which the HARQ feedback information is located is less than or equal to a first threshold; a time length of a time domain resource of the PDSCH indicated by the DCI is less than or equal to a second threshold; a time length of a time domain resource of the PUSCH indicated by the DCI is less than or equal to a third threshold; a time length of a time domain resource of the SRS is less than or equal to a fourth threshold; and a quantity of resource groups of the SRS is less than or equal to a fifth threshold.

In a possible implementation, the determining, based on the DCI and/or higher layer signaling, a first time interval in a plurality of candidate first time intervals corresponding to a first subcarrier spacing includes: when a radio network temporary identifier (RNTI) used to scramble the DCI is a first RNTI, determining the first time interval, where modulation and coding scheme (MCS) information in the DCI scrambled by using the first RNTI corresponds to a first MCS table, and the first MCS table includes one piece of MCS information whose spectral efficiency is 0.0586.

According to a second aspect, a method for receiving an SRS is provided. The method may be performed by a network device, or may be performed by a chip in a network device. The method includes: sending DCI to a terminal device on a PDCCH, where the DCI includes first indication information, the first indication information is used to trigger the terminal device to send an SRS, and the DCI and/or higher layer signaling is further used to instruct to determine a first time interval in a plurality of candidate first time intervals corresponding to a first subcarrier spacing, where the first time interval is used to determine whether the first indication information is valid; the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing; and a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols; and receiving the SRS from the terminal device.

In a possible implementation, when a time interval between the last symbol of the PDCCH and the first symbol in which the SRS is located is greater than or equal to the first time interval, the first indication information is valid; or when a time interval between the last symbol of the PDCCH and the first symbol in which the SRS is located is less than the first time interval, the first indication information is invalid.

In a possible implementation, the method further includes: sending the higher layer signaling.

In a possible implementation, the first time interval meets the following condition: the first time interval is less than or equal to a time interval between the last symbol of a PDSCH indicated by the DCI and the first symbol of a first uplink channel, where the first uplink channel is used to carry HARQ feedback information corresponding to the PDSCH indicated by the DCI; or the first time interval is less than or equal to a time interval between the last symbol of the PDCCH and the first symbol of a first uplink channel, where the first uplink channel is used to carry a physical uplink shared channel PUSCH indicated by the DCI.

In a possible implementation, the first subcarrier spacing is a smaller value of a subcarrier spacing corresponding to the PDCCH and a subcarrier spacing corresponding to the SRS.

In a possible implementation, the method further includes: scrambling the DCI by using a first RNTI, where the first RNTI corresponds to the first time interval, modulation and coding scheme MCS information in the DCI scrambled by using the first RNTI corresponds to a first MCS table, and the first MCS table includes one piece of MCS information whose spectral efficiency is 0.0586.

According to a third aspect, a communications apparatus is provided. The communications apparatus has a function of implementing the terminal device in the foregoing method embodiment. The functions may be implemented by hardware, or may be implemented by hardware executing corresponding software. The hardware or the software includes one or more units corresponding to the foregoing functions.

According to a fourth aspect, a communications apparatus is provided. The communications apparatus has a function of implementing the network device in the foregoing method embodiment. The functions may be implemented by hardware, or may be implemented by hardware executing corresponding software. The hardware or the software includes one or more units corresponding to the foregoing functions.

According to a fifth aspect, a communications apparatus is provided. The communications apparatus may be the terminal device in the foregoing method embodiment, or may be a chip disposed in the terminal device. The communications apparatus includes a memory, a communications interface, and a processor. The memory is configured to store a computer program or an instruction. The processor is coupled to the memory and the communications interface. When the processor executes the computer program or the instruction, the communications apparatus is enabled to perform the method performed by the terminal device in the foregoing method embodiment.

According to a sixth aspect, a communications apparatus is provided. The communications apparatus may be the network device in the foregoing method embodiment, or may be a chip disposed in the network device. The communications apparatus includes a memory, a communications interface, and a processor. The memory is configured to store a computer program or an instruction. The processor is coupled to the memory and the communications interface. When the processor executes the computer program or the instruction, the communications apparatus is enabled to perform the method performed by the network device in the foregoing method embodiment.

According to a seventh aspect, a computer program product is provided. The computer program product includes computer program code, and when the computer program code is run on a computer, the computer is enabled to perform the method in the foregoing aspects performed by the terminal device.

According to an eighth aspect, a computer program product is provided. The computer program product includes computer program code, and when the computer program code is run on a computer, the computer is enabled to perform the method in the foregoing aspects performed by the network device.

According to a ninth aspect, this application provides a chip system. The chip system includes a processor, configured to implement functions of the terminal device in the method in the foregoing aspects, for example, receive or process data and/or information in the foregoing method. In a possible design, the chip system further includes a memory. The memory is configured to store a program instruction and/or data. The chip system may include a chip, or may include a chip and another discrete component.

According to a tenth aspect, this application provides a chip system. The chip system includes a processor, configured to implement functions of the network device in the method in the foregoing aspects, for example, receive or process data and/or information in the foregoing methods. In a possible design, the chip system further includes a memory. The memory is configured to store a program instruction and/or data. The chip system may include a chip, or may include a chip and another discrete component.

According to an eleventh aspect, this application provides a computer-readable storage medium. The computer-readable storage medium stores a computer program, and when the computer program is run, the method performed by the terminal device in the foregoing aspects is implemented.

According to a twelfth aspect, this application provides a computer-readable storage medium. The computer-readable storage medium stores a computer program, and when the computer program is run, the method performed by the network device in the foregoing aspects is implemented.

DESCRIPTION OF EMBODIMENTS

Figure 1:
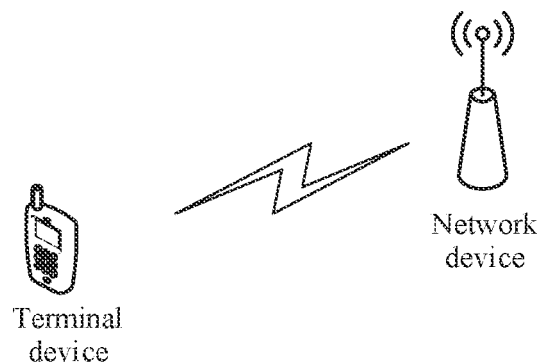
FIG. 1 is a schematic diagram of an application environment according to an embodiment of this application.

The following describes technical solutions of this application with reference to the accompanying drawings.

The technical solutions in the embodiments of this application may be applied to various communications systems, for example, a long term evolution (LTE) system, a 5th generation (5G) mobile communications system or a new radio (NR) communications system, and future mobile communication systems.

The terminal device in the embodiments of this application may be user equipment (UE), an access terminal, a subscriber unit, a subscriber station, a mobile station, a mobile console, a remote station, a remote terminal, a user terminal, a terminal, a user apparatus, or the like. Alternatively, the terminal device may be a handheld device or a computing device that has a wireless communication function, or another processing device connected to a wireless modem, a vehicle-mounted device, a wearable device, or the like. This is not limited in the embodiments of this application.

A network device in the embodiments of this application may be a device configured to communicate with a terminal device. The network device may be a base station, or may be an evolved NodeB (eNB, or eNodeB) in an LTE system, or may be a radio controller in a cloud radio access network (CRAN) scenario. Alternatively, the network device may be a relay node, an access point, a vehicle-mounted device, a new generation NodeB (gNodeB) in a 5G network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), or a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device, for example, a chip module.

FIG. 1 is a schematic diagram of a possible application scenario according to an embodiment of this application. As shown in FIG. 1, the application scenario may include a terminal device and a network device. For specific descriptions of the terminal device and the network device, refer to the foregoing descriptions. In an example, the terminal device may be a mobile terminal, and the network device may be an access network device. As shown in FIG. 1, the terminal device may access a network by using the network device, and the terminal device and the network device may communicate with each other by using a radio link.

Figure 2:
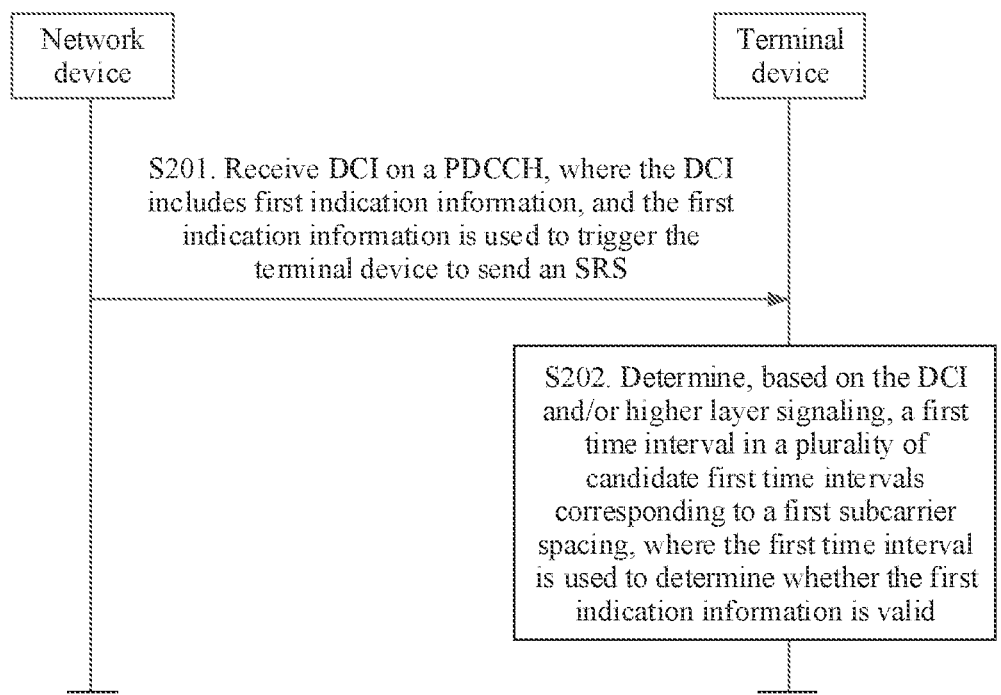
FIG. 2 is a schematic flowchart of a method for sending an SRS according to an embodiment of this application.

FIG. 2 is a schematic flowchart of a method for sending an SRS according to an embodiment of this application. The method in FIG. 2 may be performed by a terminal device and a network device, or may be performed by a chip in a terminal device and a chip in a network device. In FIG. 2, the terminal device and the network device are used as examples for description. The method in FIG. 2 includes the following steps.

S201. A terminal device receives DCI on a PDCCH, and correspondingly, a network device sends the DCI on the PDCCH, where the DCI includes first indication information, and the first indication information is used to trigger the terminal device to send an SRS.

The SRS may also be referred to as a channel sounding reference signal. The SRS is usually used to measure signal quality of an uplink channel. For example, the SRS is used to estimate frequency domain information and the like of the uplink channel. Optionally, in some scenarios, for example, in a TDD system, because uplink and downlink signals are sent in a same frequency band, the network device may also obtain downlink channel quality based on the SRS. The network device may also allocate a corresponding downlink transmission resource to the terminal device based on the SRS sent by the terminal device. The SRS may include a periodic SRS, for example, a periodic sounding reference signal (P-SRS). The SRS may also include an aperiodic SRS, for example, an aperiodic sounding reference signal (A-SRS).

The P-SRS may be an SRS periodically sent by the terminal device to the network device. The A-SRS may be an SRS sent by the network device triggered by sending an activation command. The activation command may be the first indication information included in the DCI, or may be medium access control (MAC) signaling, or may be signaling of another type. This is not limited in this embodiment of this application.

S202. The terminal device determines, based on the DCI and/or higher layer signaling, a first time interval in a plurality of candidate first time intervals corresponding to a first subcarrier spacing, where the first time interval is used to determine whether the first indication information is valid; the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing; and a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols.

In this embodiment of this application, a value of the first time interval is limited, so that the terminal device can send the SRS in time based on the first time interval, then the network device can obtain uplink channel quality or uplink and downlink channel quality in time. In this way, the network device more accurately allocates a resource, thereby improving system resource usage efficiency and communication efficiency.

Optionally, the symbol is a time-domain symbol. It may be understood that a communications system performs scheduling in a unit of symbol. The communications system may support various time scheduling units. For example, time scheduling in the unit of symbol is usually referred to as non-slot based scheduling, where a time length of the non-slot based scheduling may be one or more symbols. Time scheduling in a unit of slot may be referred to as slot based scheduling.

Optionally, the symbol may be an orthogonal frequency division multiplexing (OFDM) symbol. The OFDM symbol may use transform precoding. If transform precoding is used, the foregoing symbol may also be referred to as a single-carrier frequency division multiplexing (SC-FDM) symbol.

Optionally, the first time interval may indicate a shortest time interval from the last symbol of the PDCCH carrying the DCI to the first symbol of the SRS triggered by the DCI. Alternatively, the first time interval may be understood as a shortest time interval from "receiving the DCI" to "sending the SRS". In other words, in an actual system, the time interval from the last symbol of the PDCCH carrying the DCI to the first symbol of the SRS triggered by the DCI needs to be greater than or equal to the first time interval. If the time interval is less than the first time interval, the terminal device may not send the SRS, or ignore the DCI that is sent by the network device and that triggers the SRS.

In this embodiment of this application, the higher layer signaling may be signaling sent by a higher-layer protocol layer. The higher-layer protocol layer is at least one protocol layer above a physical layer. The higher-layer protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

In some examples, the method further includes: when a time interval between the last symbol of the PDCCH and the first symbol in which the SRS is located is greater than or equal to the first time interval, determining that the first indication information is valid; or when a time interval between the last symbol of the PDCCH and the first symbol in which the SRS is located is less than the first time interval, determining that the first indication information is invalid.

If the time interval between the last symbol of the PDCCH and the first symbol in which the SRS is located is greater than or equal to the first time interval, it indicates that the terminal device has sufficient time to send the SRS. Therefore, the terminal device may determine that the first indication information is valid. Otherwise, it indicates that the terminal device does not have sufficient time to send the SRS. Therefore, the terminal device may determine that the first indication information is invalid.

In some examples, the method in FIG. 2 further includes: determining, based on the first time interval, whether to send the SRS. For example, if it is determined, based on the first time interval, that the first indication information is valid, the terminal device sends the SRS triggered by the first indication information. For example, if it is determined, based on the first time interval, that the first indication information is invalid, the terminal device may not send the SRS triggered by the first indication information.

Optionally, the first indication information may indicate a time-frequency resource used by the terminal device to send the SRS, so that the terminal device determines, based on the time-frequency resource of the SRS, the time interval between the last symbol of the PDCCH and the first symbol in which the SRS is located. The first indication information may indicate, from a plurality of preconfigured SRS time-frequency resources, the time-frequency resource used by the SRS. Herein, the plurality of preconfigured SRS time-frequency resources may be configured by using the higher layer signaling or predefined. For example, assuming that the first indication information includes two bits, 00 may indicate that the SRS uses a first SRS time-frequency resource configuration, 01 may indicate that the SRS uses a second SRS time-frequency resource configuration, 10 may indicate that the SRS uses a third SRS time-frequency resource configuration, and 11 may indicate that the SRS uses a fourth SRS time-frequency resource configuration.

Optionally, the first indication information may instruct the terminal device to send or not to send the SRS, so that the terminal device sends the SRS based on the first indication information and the SRS time-frequency resource that is configured by using the higher layer signaling or predefined. For example, assuming that the first indication information includes 1 bit, 0 may indicate not to send the SRS, and 1 may indicate to send the SRS. It may be understood that, in this case, the time-frequency resource for sending the SRS is predefined or preconfigured by using the higher layer signaling, and does not need to be notified by using the first indication information in the DCI. Compared with a method in which the first indication information may indicate the time-frequency resource for sending the SRS, fewer bits are used in this method, a quantity of bits of the DCI may be reduced, thereby improving downlink system transmission efficiency.

For example, in an example, the terminal device may determine whether the time interval between the last symbol of the PDCCH and the first symbol in which the SRS is located is greater than the first time interval. If the time interval is greater than the first time interval, the terminal device sends the SRS; if the time interval is less than the first time interval, the terminal device may not send the SRS triggered by the first indication information.

Optionally, the value of the first time interval meets at least one of the values shown in Table 1. In this embodiment of this application, X1, X2, X3, and X4 respectively indicate first time intervals corresponding to subcarrier spacings of 15 kHz, 30 kHz, 60 kHz, and 120 kHz. Details are not described in the following.

TABLE 1

| Subcarrier spacing (Unit: kHz) | First time interval (Unit: symbol) |
|---|---|
| 15 | X1 |
| 30 | X2 |

TABLE 1-continued

| Subcarrier spacing (Unit: kHz) | First time interval (Unit: symbol) |
|---|---|
| 60 | X3 |
| 120 | X4 |

Optionally, X1, X2, X3, and X4 are positive numbers greater than 0, X1≤8, X2≤12, X3≤24, and X4≤42.

Optionally. X1≤X2≤X3≤X4.

For example, X1 may be one of the following: 1, 1.5, 2, 2.5, 3, 3.5, 4, 4.5, 5, 5.5, 6, 6.5, 7, 7.5 or 8.

For example, X2 may be one of the following: 1, 1.5, 2, 2.5, 3, 3.5, 4, 4.5, 5, 5.5, 6, 6.5, 7, 7.5, 8, 8.5, 9, 9.5, 10, 10.5, 11, 11.5 or 12.

For example, X3 may be one of the following: 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5 or 24.

For example, X4 may be one of the following: 1, 1.5, 2, 2.5, 3, 3.5, 4, 4.5, 5, 5.5, 6, 6.5, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5. 39, 39.5, 40, 40.5, 41, 41.5 or 42.

Optionally, X1, X3, and X4 are positive integers, and X2 is a positive integer or a positive non-integer.

Optionally, the first time interval has a plurality of values. For example, X1, X2, X3, and X4 in Table 1 may meet at least one of the following conditions: X1≤X2≤2×X1, X2≤X3≤2×X2, and X3≤X4≤2×X3. The foregoing formulas are respectively used to indicate that a value range of X2 may be from X1 to 2×X1, a value range of X3 may be from X2 to 2×X2, and a value range of X4 may be from X3 to 2×X3.

In some other embodiments, X1, X2, X3, and X4 in Table 1 may meet at least one of the following conditions: X1≤A×10 or A×9, X1≤B×13, X1≤C×25, and X1≤D×43, where A, B, C, and D are positive numbers greater than 0 and less than or equal to 1.

In this embodiment of this application, the value of the first time interval is limited, so that the terminal device can send the SRS in time based on the first time interval. In this way, the network device more accurately allocates a downlink resource, thereby improving the system resource usage efficiency and the communication efficiency.

In an example, the value of the first time interval may meet at least one of the following: X1≤3, X2≤4.5, and X3≤9.

In an example, the value of the first time interval may meet at least one of the following: X1≤5, X2≤5.5, and X3≤11.

Optionally, the value of the first time interval may meet at least one of the values shown in Table 2.

TABLE 2

| Subcarrier spacing (Unit: kHz) | First time interval (Unit: symbol) |
|---|---|
| 15 | 5 |
| 30 | 7 |
| 60 | 13 |
| 120 | 22 |

It should be noted that the subcarrier spacings of 15 kHz, 30 kHz, 60 kHz, and 120 kHz in this embodiment of this application may also be replaced with index numbers. For example, 0 represents the subcarrier spacing of 15 kHz, 1 represents the subcarrier spacing of 30 kHz, 2 represents the subcarrier spacing of 60 kHz, and 3 represents the subcarrier spacing of 120 kHz.

Optionally, some items in Table 1 and Table 2 may be recombined to form a new table. The first time interval may be determined in the new table. The new table may include, for example, a part of Table 1 or a part of Table 2, for example, include content of one row, two rows, and three rows in Table 1. Or include content of one row, two rows, or three rows in Table 2. Alternatively, some items in Table 1 or Table 2 are recombined. Alternatively, the new table may indicate a correspondence between some subcarrier spacings and the first time interval. The subcarrier spacing may be, for example, one or more of 15 kHz, 30 kHz, 60 kHz, or 120 kHz.

The plurality of candidate first time intervals may include the first time intervals shown in Table 1 and Table 2. Optionally, the plurality of candidate first time intervals may also include a first time interval shown in Table 3. In other words, the candidate first time interval may include a candidate first time interval different from the first time interval limited in S202. Alternatively, the candidate first time interval may be another candidate first time interval. This is not limited in this embodiment of this application. Optionally, in some embodiments, the terminal device may alternatively select the first time interval from Table 3, to send the SRS.

TABLE 3

| Subcarrier spacing (Unit: kHz) | First time interval (Unit: symbol) |
|---|---|
| 15 | 10 or 9 |
| 30 | 13 |
| 60 | 25 |
| 120 | 43 |

It should be noted that, in this embodiment of this application, the subcarrier spacing corresponding to the first time interval may include one or more of 15 kHz, 30 kHz, 60 kHz, and 120 kHz, or may include another subcarrier spacing, for example, 240 kHz. The first time intervals in Table 1 and Table 2 may be considered as relatively short first time intervals, and the first time intervals in Table 3 may be considered as relatively long first time intervals. A relatively short first time interval may support only some subcarrier spacings. For example, the relatively short first time interval may support only subcarrier spacings of 15 kHz, 30 kHz, and 60 kHz, or the relatively short first time interval may support only subcarrier spacings of 30 kHz and 60 kHz, or the relatively short first time interval may support only subcarrier spacings 15 kHz and 30 kHz. It may be understood that, in this case, the another subcarrier spacing does not support the relatively short first time interval, so that the another subcarrier spacing may use the relatively long first time interval. For example, a value shown in Table 3 or greater than that shown in Table 3 may be used as the first time interval.

In some examples, the terminal device may support a plurality of types of services, for example, enhanced mobile broadband (eMBB), ultra-reliable low latency communication (URLLC), and massive machine type communications (mMTC). The plurality of different types of services may include a latency-sensitive service, for example, a uRLLC service, or may include a latency-insensitive service. Therefore, for different types of services, the terminal device is not required to always quickly send the SRS. Therefore, the terminal device may determine an appropriate first time interval in the plurality of candidate first time intervals to send the SRS, to design a flexible method for sending the SRS. In addition, by using a dynamic SRS notification method, when the terminal device does not need to feed back the SRS in time, the terminal device may perform calculation slowly, to save power of the terminal device and save hardware resources of the terminal device.

In this embodiment of this application, the plurality of candidate first time intervals may be preconfigured or predefined for the first subcarrier spacing. The terminal device may select the appropriate first time interval from the plurality of candidate first time intervals based on the DCI and/or the higher layer signaling, and determine, based on the first time interval, whether to send the SRS, thereby improving flexibility of sending the SRS.

Optionally, the first subcarrier spacing may be used to determine a corresponding first time interval. For example, the corresponding first time interval may be determined in Table 1 to Table 3 based on the first subcarrier spacing.

It should be noted that a smaller subcarrier spacing indicates longer absolute duration corresponding to the first time interval corresponding to the subcarrier spacing. Therefore, a lower processing capability requirement is imposed on the terminal device.

Optionally, in some examples, the first subcarrier spacing is a smaller value of a subcarrier spacing corresponding to the PDCCH and a subcarrier spacing corresponding to the SRS.

Optionally, in some examples, the first time interval meets the following conditions: the first time interval is less than or equal to a time interval between the last symbol of a PDSCH indicated by the DCI and the first symbol of a first uplink channel, where the first uplink channel is used to carry HARQ feedback information corresponding to the PDSCH indicated by the DCI; and the first subcarrier spacing is any one of the following: the 15 kHz subcarrier spacing, the 30 kHz subcarrier spacing, the 60 kHz subcarrier spacing, or the 120 kHz subcarrier spacing.

If the information in the PDSCH is correctly decoded and received, the HARQ feedback information may feed back an acknowledgement (ACK) signal. If the information in the PDSCH is incorrectly decoded and received, the HARQ feedback information may feed back a negative acknowledgment (NACK) signal. The HARQ feedback information may include ACK and/or NACK information corresponding to a plurality of PDSCHs. After receiving the NACK signal, the network device may retransmit the PDSCH that is incorrectly decoded.

Further, in some examples, the first time interval meets the following condition: the first time interval corresponding to the first subcarrier spacing is less than or equal to a third time interval corresponding to the first subcarrier spacing, where the third time interval is less than or equal to the time interval between the last symbol of the PDSCH indicated by the DCI and the first symbol of the first uplink channel.

In some examples, the third time interval may be a process time 1, and the process time 1 may be represented by using the following formula (1):

$$T_{proc,1} = ((N_1 + d_{1,1} + d_{1,2})(2048+144) \cdot \kappa 2^{-\mu}) \cdot T_C, \quad (1)$$

where $T_{proc,1}$ indicates the process time 1.

A value of $N_1$ may be determined based on the following Table 4 and Table 5. The corresponding $N_1$ may be determined in Table 4 and Table 5 based on the first subcarrier spacing and different processing capabilities of the terminal device.

For example, $d_{1,1}$ and $d_{1,2}$ are integers greater than or equal to 0. For example, $d_{1,1}=0$ or 1, $d_{1,2}=0$, 1, 2, 3, 4 or 5.

The constant $\kappa$ is 64.

$T_c$ represents a time unit, where $T_c=1/(\Delta f_{max} \cdot N_f)$, $\Delta f_{max}=480 \cdot 10^3$ Hz, and $N_f=4096$.

$\mu$ represents a value corresponding to the subcarrier spacing. For example, 0 indicates the 15 kHz subcarrier spacing, 1 indicates the 30 kHz subcarrier spacing, 2 indicates the 60 kHz subcarrier spacing, and 3 indicates the 120 kHz subcarrier spacing.

Optionally, in an example, the value of $N_1$ may meet at least one of the values shown in Table 4 and Table 5. A PDSCH processing capability of the terminal device in Table 4 is different from a PDSCH processing capability of the terminal device in Table 5. Table 4 and Table 5 include a case in which there is an additional PDSCH demodulation reference signal configuration and a case in which there is no additional PDSCH demodulation reference signal configuration. The case in which there is an additional PDSCH demodulation reference signal configuration means that there may be DMRSs that occupy two inconsecutive symbols; and the case in which there is no additional PDSCH demodulation reference signal configuration means that there is only a DMRS that occupies one or two consecutive symbols.

TABLE 4

| Subcarrier spacing (Unit: kHz) | $N_1$ (Unit: symbol) PDSCH processing capability 1 | |
|---|---|---|
| | No additional PDSCH demodulation reference signal configuration | Additional PDSCH demodulation reference signal configuration |
| 15 | 8 | 13 |
| 30 | 10 | 13 |
| 60 | 17 | 20 |
| 120 | 20 | 24 |

TABLE 5

| Subcarrier spacing (Unit: kHz) | $N_1$ (Unit: symbol) PDSCH processing capability 2 | |
|---|---|---|
| | No additional PDSCH demodulation reference signal configuration | Additional PDSCH demodulation reference signal configuration |
| 15 | 3 | 13 |
| 30 | 4.5 | 13 |
| 60 | 9 | 20 |

In some other examples, the third time interval may alternatively be $N_1$ in Table 4 and Table 5. Optionally, in some examples, $N_1$ may be understood as a shortest time interval required by the terminal device from receiving the PDSCH to sending the HARQ feedback information corresponding to the PDSCH.

In some other examples, the first time interval meets the following condition: the first time interval is less than or equal to a time interval between the last symbol of the PDCCH and the first symbol of a second uplink channel, where the second uplink channel is used to carry a PUSCH indicated by the DCI.

Further, in some examples, the first time interval meets the following condition: the first time interval corresponding to the first subcarrier spacing is less than or equal to a fourth time interval corresponding to the first subcarrier spacing where the fourth time interval is less than or equal to the time interval between the last symbol of the PDCCH and the first symbol of the second uplink channel, where the second uplink channel is used to carry the PUSCH indicated by the DCI.

In some examples, the fourth time interval may be a process time 2, and the process time 2 may be represented by using the following formula (2):

$$T_{proc,2}=\max(((N_2+d_{2,1}+d_{2,2})(2048+144)\cdot\kappa 2^{-\mu})\cdot T_C, d_{2,3}), \quad (2)$$

where $T_{proc\_2}$ indicates the process time 2.

A value of $N_2$ may be determined based on the following Table 6 and Table 7. The corresponding $N_2$ may be determined in Table 6 and Table 7 based on the first subcarrier spacing and different processing capabilities of the terminal device.

For example, $d_{2,1}$ and $d_{2,2}$ are integers greater than or equal to 0 $d_{2,1}$ is equal to switching time of frequency domain in transmission, otherwise $d_{2,1}=0$. For example, $d_{2,1}=0$ or 1, and $d_{2,2}=0$ or 1.

The constant κ is 64.

$T_c$ represents a time unit, where $T_c=1/(\Delta f_{max} \cdot N_f)$, $\Delta f_{max}=480 \cdot 10^3$ Hz, and $N_f=4096$.

μ represents the value corresponding to the subcarrier spacing. For example, 0 indicates the 15 kHz subcarrier spacing, 1 indicates the 30 kHz subcarrier spacing, 2 indicates the 60 kHz subcarrier spacing, and 3 indicates the 120 kHz subcarrier spacing.

Optionally, in an example, the value of $N_2$ may meet at least one of the values shown in Table 6 and Table 7. A PDSCH processing capability of the terminal device in Table 6 is different from a PDSCH processing capability of the terminal device in Table 7.

TABLE 6

| Subcarrier spacing (Unit: kHz) | $N_2$ (Unit: symbol) PUSCH processing capability 1 |
| --- | --- |
| 15 | 10 |
| 30 | 12 |
| 60 | 23 |
| 120 | 36 |

TABLE 7

| Subcarrier spacing (Unit: kHz) | $N_2$ (Unit: symbol) PUSCH processing capability 2 |
| --- | --- |
| 15 | 5 |
| 30 | 5.5 |
| 60 | 11 |

In some other examples, the fourth time interval may alternatively be $N_2$ in Table 6 and Table 7. Optionally, $N_2$ may be understood as a shortest time interval from receiving the PDCCH to sending the second uplink channel by the terminal device.

Figure 3:
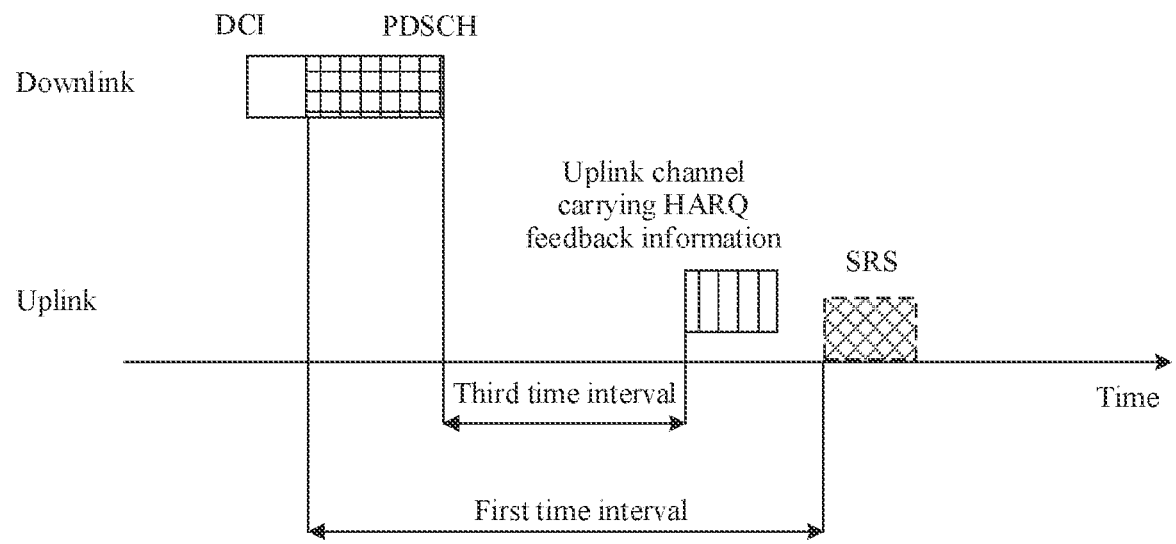
FIG. 3 is a schematic diagram of a scenario of sending an SRS according to another embodiment of this application.

FIG. 3 is a schematic diagram of a scenario of sending an SRS according to an embodiment of this application. FIG. 3 is a schematic diagram of sending the SRS and HARQ feedback information. As shown in FIG. 3, in a downlink transmission process, a network device may send DCI, and instruct, by using the DCI, the network device to transmit downlink data by using a PDSCH. The DCI may further indicate a resource used by a terminal device to send HARQ feedback information corresponding to the PDSCH.

It is assumed that the network device in FIG. 3 obtains downlink channel quality based on the SRS. For example, FIG. 3 may be a TDD system. It can be learned from FIG. 3 that, if a third time interval is greater than or equal to a first time interval, that is, assuming that the network device first receives the HARQ feedback information and then receives the SRS, the following two cases exist. In a first case, after receiving the HARQ feedback information, the network device waits for a period of time to receive the SRS, and after receiving the SRS, the network device retransmits the downlink data or transmits new downlink data based on the SRS. Although an accurate SRS can be used to improve system efficiency, an extra latency is introduced, and latency-sensitive services, such as an uRLLC service, are affected. In a second case, after receiving the HARQ feedback information, the network device immediately retransmits the downlink data or transmits new downlink data. However, the network device does not wait for a latest SRS. Consequently, system transmission efficiency is affected because information of a previous SRS that is used is not accurate enough.

In this embodiment of this application, the first time interval corresponding to the first subcarrier spacing is less than or equal to a third time interval corresponding to the first subcarrier spacing. For example, the third time interval may be the process time 1 or $N_1$, so that the network device can allocate a resource based on the SRS sent in time, thereby improving resource allocation efficiency.

Optionally, in some examples, the DCI or the higher layer signaling may include at least one piece of the following information: a time interval between a slot in which a PDSCH indicated by the DCI is located and a slot in which the HARQ feedback information is located, a start symbol and/or a time length of a time domain resource of the PDSCH indicated by the DCI, and a time length of a time domain resource of the SRS and a quantity of resource groups of the SRS.

Alternatively, the at least one piece of information may be carried in the DCI or the higher layer signaling, or may be carried in another type of signaling. This is not limited in this embodiment of this application.

In this embodiment of this application, the DCI may include the one or more of information, so that the terminal device sends the SRS based on the information included in the DCI, and the terminal device can flexibly send various SRSs, thereby improving communication efficiency.

Optionally, the determining, based on the DCI and/or higher layer signaling, a first time interval in a plurality of candidate first time intervals corresponding to a first subcarrier spacing may include directly indicating the first time interval by the DCI and/or the higher layer signaling. For example, the DCI or the higher layer signaling may include indication information, where the indication information is used to indicate a corresponding first time interval for sending the SRS. The terminal device may directly determine, based on the indication information, the corresponding first time interval for sending the SRS. Alternatively, a table corresponding to a plurality of first time intervals may be predefined in a protocol, for example, Table 1 and Table 2. The network device may notify the terminal device of the subcarrier spacing by using the higher layer signaling. Further, the network device instructs, by using the DCI, the terminal device to select one of the tables corresponding to the plurality of first time intervals.

Optionally, in some examples, the terminal device determines the first time interval when at least one of the following conditions is met: a time interval between a slot in which the PDSCH indicated by the DCI is located and a slot in which the HARQ feedback information is located is less than or equal to a first threshold; a time length of a time domain resource of the PDSCH indicated by the DCI is less than or equal to a second threshold; a time length of a time domain resource of the PUSCH indicated by the DCI is less than or equal to a third threshold; a time length of a time domain resource of the SRS is less than or equal to a fourth threshold; and a quantity of resource groups of the SRS is less than or equal to a fifth threshold.

Optionally, the terminal device determines the first time interval may include: the terminal device determines to use a relatively short first time interval. For example, the terminal device determines to use the first time interval limited in S202, or determines to use the first time interval shown in Table 1 or Table 2.

The first threshold to the fifth threshold are not limited in this embodiment of this application. The first threshold to the fifth threshold may be predefined, or may be values configured by the network device for the terminal device by using the higher layer signaling, or may be values obtained in another manner. The first threshold to the fifth threshold may be integers greater than or equal to 0. The terminal device may obtain, by using the DCI, information used to determine the first time interval, or may obtain, in another manner, for example, by using the higher layer signaling, information used to determine the first time interval. This is not limited in this embodiment of this application.

In this embodiment of this application, the terminal device may determine the first time interval based on at least one of the information included in the DCI or the higher layer signaling, or the terminal device determines, based on at least one of the plurality of pieces of information, to send the SRS based on the first time interval, thereby improving the communication efficiency.

The following continues to describe various manners of determining the first time interval by the terminal device with reference to examples. In this embodiment of this application, the information about the first time interval may be determined by using the DCI, the higher layer signaling, or another type of signaling indication. The following example is described by using an example in which the DCI indicates the information for determining the first time interval.

In a first manner, if the time interval between the slot in which the PDSCH indicated by the DCI is located and the slot in which the HARQ feedback information is located is less than or equal to the first threshold, it may be considered that the network device requires the terminal device to quickly send the SRS. In other words, it may be considered that a current transmission service is relatively sensitive to time. Therefore, a shorter first time interval should be used to send the SRS, to improve system resource efficiency. It may be understood that the terminal device may determine the first time interval based on the time interval between the slot in which the PDSCH indicated by the DCI is located and the slot in which the HARQ feedback information is located. In an example, the DCI may include first field information, to indicate the time interval between the slot in which the PDSCH is located and the slot in which the HARQ feedback information is located. In an example, the DCI may include first field information, to indicate the time interval between the slot in which the PDSCH is located and the slot in which the HARQ feedback information is located. For example, the slot in which the PDSCH is located is a slot n. If the first field information indicates k, it indicates that the slot in which the HARQ feedback information is located is a slot n+k. It may be understood that the time interval between the slot in which the PDSCH indicated by the DCI is located and the slot in which the HARQ feedback information is located may be a time interval between a start time of the slot in which the PDSCH indicated by the DCI is located and a start time of the slot in which the HARQ feedback information is located, or may be an index difference between an index of the slot in which the PDSCH indicated by the DCI is located and an index of the slot in which the HARQ feedback information is located. This is not limited in this application.

For example, if the time interval between the slot in which the PDSCH indicated by the DCI is located and the slot in which the HARQ feedback information is located is less than or equal to the first threshold, the first time interval in Table 1 or Table 2 is determined. Otherwise, the terminal device may determine another first time interval, and the another first time interval may be greater than the first time interval in Table 1 and Table 2, for example, the first time interval in Table 3. In another example, if the terminal device uses the PDSCH processing capability 2 (referring to Table 5), and the first field information indicates that k is 0, it is determined that the relatively short first time interval is used. For example, the first time interval in Table 1 or Table 2 may be used to send the SRS. In other words, when a PDSCH processing capability of the terminal device is relatively strong, the relatively short first time interval may be used.

In a second manner, if the time length of the time domain resource of the PDSCH indicated by the DCI is less than or equal to the second threshold, it may be considered that the network device requires the terminal device to quickly receive the PDSCH. Generally, an urgent service is a small-packet service, and only a relatively short time domain resource is required for quick transmission. In other words, it may be considered that a current transmission service is relatively sensitive to time. Therefore, a shorter first time interval should be used to send the SRS. In this way, the network device can allocate a resource based on the SRS, thereby improving the system resource efficiency. In this scenario, the terminal device may determine the first time interval based on the time length of the time domain resource of the PDSCH indicated by the DCI. The time length of the time domain resource of the PDSCH may be determined based on PDSCH time domain indication information in the DCI, or may be determined in a predefined manner. For example, the DCI may include second field information to the time length of the time domain resource of the PDSCH indicated by the DCI. For example, the time length of the time domain resource of the PDSCH may be one of the following: 1, 2, 3, 4, 5, 6, 7, 8, 9, 10, 11, 12, 13, and 14.

For example, if the time length of the time domain resource of the PDSCH is less than or equal to the second threshold, the relatively short first time interval is determined, for example, the first time interval in Table 1 or Table 2 is determined. Otherwise, the terminal device may determine another first time interval, and the another first time interval may be greater than the first time interval in Table 1 and Table 2, for example, the first time interval in Table 3. For example, it is assumed that the second threshold is 7. If the time length of the time domain resource of the PDSCH is less than or equal to 7, the terminal device may determine the first time interval in Table 1 and Table 2. Otherwise, if the time length of the time domain resource of the PDSCH is greater than 7, the terminal device may determine the first time interval in Table 3.

In a third manner, if the time length of the time domain resource of the PUSCH indicated by the DCI is less than or equal to the third threshold, it may be considered that the network device requires the terminal device to quickly send the PUSCH. In other words, it may be considered that a current transmission service is relatively sensitive to time. Therefore, a shorter first time interval should be used to send the SRS. In this way, the network device can allocate a resource based on the SRS, thereby improving the system resource efficiency. For example, if the time length of the time domain resource of the PUSCH indicated by the DCI is less than or equal to the third threshold, it is determined to use the first time interval in Table 1 or Table 2 to send the SRS. Otherwise, the terminal device may determine another first time interval, and the another first time interval may be greater than the first time interval in Table 1 and Table 2, for example, the first time interval in Table 3. For example, if the third threshold is 2, the time length of the time domain resource of the PUSCH indicated by the DCI is less than or equal to 2, the first time interval in Table 1 or Table 2 is determined. If the time length of the time domain resource of the PUSCH indicated by the DCI is less than or equal to 2, the first time interval in Table 3 is determined.

In a fourth manner, if a time length of a time domain resource of the SRS is less than or equal to the fourth threshold, it may be considered that the network device requires the terminal device to quickly send the SRS. Generally, an urgent service is a small-packet service, and only a relatively short time domain resource is required for quick transmission. In other words, it may be considered that a current transmission service is relatively sensitive to time. Therefore, a shorter first time interval should be used to send the SRS. In this way, the network device can allocate a resource based on the SRS, thereby improving the system resource efficiency.

For example, if the time length of the time domain resource of the SRS is less than or equal to the fourth threshold, the relatively short first time interval is determined, for example, the first time interval in Table 1 and Table 2 is determined. Otherwise, the terminal device may determine another first time interval, and the another first time interval may be greater than the first time interval in Table 1 and Table 2, for example, the first time interval in Table 3. For example, it is assumed that the fourth threshold is 7. If the time length of the time domain resource of the SRS is less than or equal to 7, the terminal device may determine the first time interval in Table 1 and Table 2. Otherwise, if the time length of the time domain resource of the SRS is greater than 7, the terminal device may determine the first time interval in Table 3.

In a fifth manner, if the quantity of resource groups of the SRS is less than or equal to the fifth threshold, it may be considered that the network device requires the terminal device to quickly send the SRS. Generally, an urgent service is a small-packet service, and only a relatively short time domain resource is required for quick transmission. In other words, it may be considered that a current transmission service is relatively sensitive to time. Therefore, a shorter first time interval should be used to send the SRS. In this way, the network device can allocate a resource based on the SRS, thereby improving the system resource efficiency.

For example, if the quantity of resource groups of the SRS is less than or equal to the fifth threshold, the relatively short first time interval is determined, for example, the first time interval in Table 1 and Table 2 is determined. Otherwise, the terminal device may determine another first time interval, and the another first time interval may be greater than the first time interval in Table 1 and Table 2, for example, the first time interval in Table 3. For example, it is assumed that the fifth threshold is 3. If the quantity of resource groups of the SRS is less than or equal to 3, the terminal device may determine the first time interval in Table 1 and Table 2. Otherwise, if the quantity of resource groups of the SRS is greater than 3, the terminal device may determine the first time interval in Table 3.

In a sixth manner, when a radio network temporary identifier (RNTI) used to scramble the DCI is a first RNTI, the terminal device may determine the first time interval, where modulation and coding scheme MCS information in the DCI scrambled by using the first RNTI corresponds to a first MCS table, and the first MCS table includes one piece of MCS information whose spectral efficiency is 0.0586. For example, the terminal device may determine the first time interval in Table 1 to Table 5.

Optionally, another RNTI identifier may alternatively be used to indicate the first time interval to the terminal device.

In this embodiment of this application, the terminal device may determine the first time interval based on a type of RNTI used to scramble the DCI. In other words, the type of RNTI used to scramble the DCI may implicitly indicate the first time interval, thereby improving the communication efficiency.

The first MCS table may be Table 8 or Table 9 shown below. It can be learned that an MCS index corresponding to the spectral efficiency of 0.0586 in Table 8 or Table 9 is 0. The foregoing is merely an example. In another example, the MCS information including the spectral efficiency of 0.0586 may alternatively be represented in another form. This is not limited in this embodiment of this application.

In some examples a value of q in Table 9 may be 1 or 2 based on the higher layer signaling. The first RNTI may be referred to as a modulation and coding scheme cell radio network temporary identifier (MCS-C-RNTI) or another identifier name may be used. This is not limited in this application. The MCS-C-RNTI may indicate lower spectral efficiency, that is, the MCS-C-RNTI may be applied to highly reliable transmission. Therefore, the DCI scrambled by using the first RNTI may implicitly notify the terminal device that an SRS triggered by the DCI is important or urgent. Therefore, the SRS needs to be sent based on the shorter first time interval. For example, the first time interval in Table 1 or Table 2 is used.

TABLE 8

| MCS index $I_{MCS}$ | Modulation order $Q_m$ | Target coding rate Rx [1024] | Spectrum efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |

TABLE 8-continued

| MCS index $I_{MCS}$ | Modulation order $Q_m$ | Target coding rate Rx [1024] | Spectrum efficiency |
|---|---|---|---|
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | Reserved | |
| 30 | 4 | Reserved | |
| 31 | 6 | Reserved | |

TABLE 9

| MCS index $I_{MCS}$ | Modulation order $Q_m$ | Target coding rate Rx [1024] | Spectrum efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | Reserved | |
| 29 | 2 | Reserved | |
| 30 | 4 | Reserved | |
| 31 | 6 | Reserved | |

In a seventh manner, when service reliability is learned, the terminal device may alternatively determine the first time interval based on the service reliability. For example, if a service corresponding to the terminal device requires a block error rate (BLER) of less than 0.00001, it may be considered that the DCI implicitly notifies the terminal device that the SRS triggered by the DCI is important or urgent. Therefore, the SRS needs to be sent based on the shorter first time interval. For example the first time interval in Table 1 or Table 2 is used.

In an eighth manner, if the search space in which the DCI is located is user-dedicated search space, the first time interval may be determined. Alternatively, the search space in which the DCI is located may implicitly indicate the first time interval. For example, if the search space in which the DCI is located is the user-dedicated search space, it is determined to use the first time interval in Table 1 or Table 2 to send the SRS. If the search space in which the DCI is located is common search space the terminal device may determine another first time interval, and the another first time interval may be greater than the first time interval in Table 1 and Table 2. For example, the another first time interval may be the first time interval in Table 3.

It may be understood that the first manner to the eighth manner may be separately used to determine the first time interval, or two or more manners may be used to jointly determine the first time interval.

Optionally, the terminal device may send first capability indication information to the network device, where the first capability indication information is used to indicate whether the terminal device has a capability of supporting the first time interval or not. For example, the terminal device may report, to the network device, that the terminal device supports the first time intervals in some or all of the tables in Table 1 and Table 2, or report, to the network device, that the terminal device does not support the first time intervals in some or all of the tables in Table 1 and Table 2.

In this embodiment of this application, the terminal device reports, to the network device, whether the terminal device has the capability of supporting the first time interval or not, so that the network device allocates a resource to the terminal device based on the reported capability of supporting the first time interval, thereby improving the communication efficiency.

Optionally, the terminal device may receive configuration information, where the configuration information is used to configure the terminal device to be capable of using the first time interval to send the SRS. For example, the terminal device is configured to be capable of sending the SRS based on a table including the first time interval. Optionally, the terminal device may send the first capability indication information to the network device before the terminal device receives the configuration information sent by the network device, to report to the network device that the terminal device supports the first time interval.

In this embodiment of this application, the terminal device can receive the configuration information, to indicate that the terminal device can send the SRS by using the first time interval, thereby improving the communication efficiency.

The foregoing describes the methods for sending an SRS in the embodiments of this application with reference to FIG. 1 to FIG. 3. The following describes apparatuses in the embodiments of this application with reference to FIG. 4 to FIG. 7.

Figure 4:
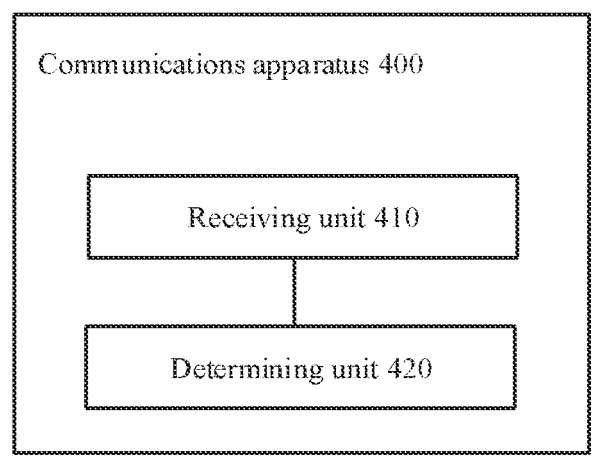
FIG. 4 is a schematic structural diagram of a communications apparatus according to an embodiment of this application.

FIG. 4 is a schematic block diagram of a communications apparatus 400 according to an embodiment of this application. The communications apparatus 400 can perform the steps performed by the terminal device in the method in FIG. 2. To avoid repetition, details are not described herein again. The communications apparatus 400 may be the terminal device or may be a chip applied to the terminal device. The communications apparatus 400 includes:

a receiving unit 410, configured to receive DCI on a PDCCH, where the DCI includes first indication information, and the first indication information is used to trigger the terminal device to send an SRS; and a determining unit 420, configured to determine, based on the DCI and/or higher layer signaling, a first time interval in a plurality of candidate first time intervals corresponding to a first subcarrier spacing, where the first time interval is used to determine whether the first indication information is valid; the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing; and a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols.

Figure 5:
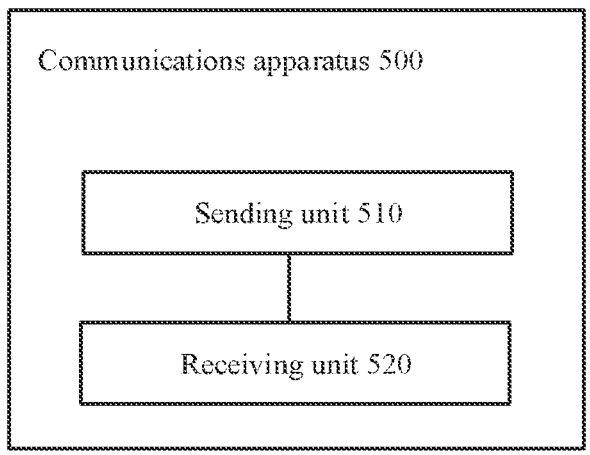
FIG. 5 is a schematic structural diagram of a communications apparatus according to another embodiment of this application.

FIG. 5 is a schematic block diagram of a communications apparatus 500 according to an embodiment of this application. The communications apparatus 500 can perform the steps performed by the network device in the method in FIG. 2. To avoid repetition, details are not described herein again. The communications apparatus 500 may be the network device or may be a chip applied to the network device. The communications apparatus 500 includes:

- a sending unit 510, configured to send DCI to a terminal device on a PDCCH, where the DCI includes first indication information, the first indication information is used to trigger the terminal device to send an SRS, and the DCI and/or higher layer signaling is further used to instruct to determine a first time interval in a plurality of candidate first time intervals corresponding to a first subcarrier spacing, where the first time interval is used to determine whether the first indication information is valid; the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing; and a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols; and
- a receiving unit 520, configured to receive the SRS from the terminal device.

Figure 6:
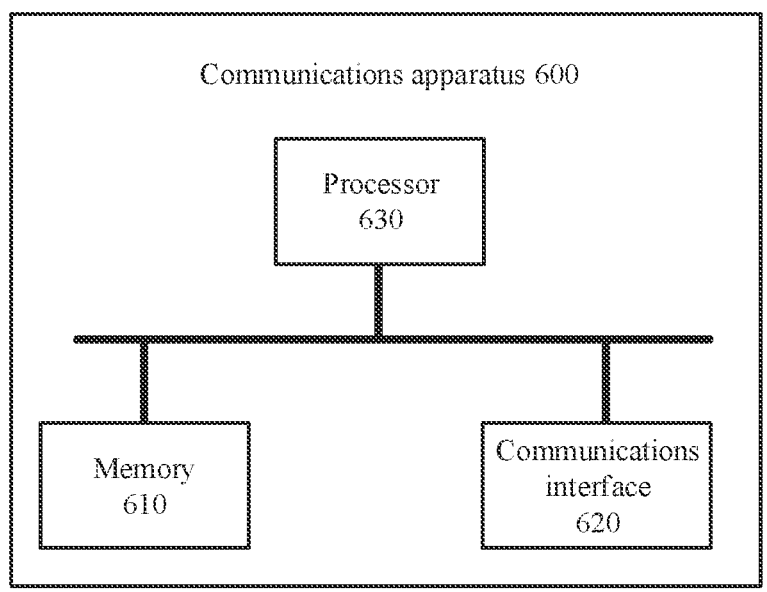
FIG. 6 is a schematic structural diagram of a communications apparatus according to another embodiment of this application.

FIG. 6 is a schematic block diagram of a communications apparatus 600 according to an embodiment of this application. It should be understood that the communications apparatus 600 can perform the steps performed by the terminal device in the method in FIG. 2. To avoid repetition, details are not described herein again. The communications apparatus 600 includes:

- a memory 610, configured to store a program;
- a communications interface 620, configured to communicate with another device; and
- a processor 630, configured to perform the program in the memory 610, where when the program is performed, the processor 630 is configured to receive DCI on a PDCCH, where the DCI includes first indication information, and the first indication information is used to trigger a terminal device to send an SRS; and determine, based on the DCI and/or higher layer signaling, a first time interval in a plurality of candidate first time intervals corresponding to a first subcarrier spacing, where the first time interval is used to determine whether the first indication information is valid; the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing; and a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols.

Figure 7:
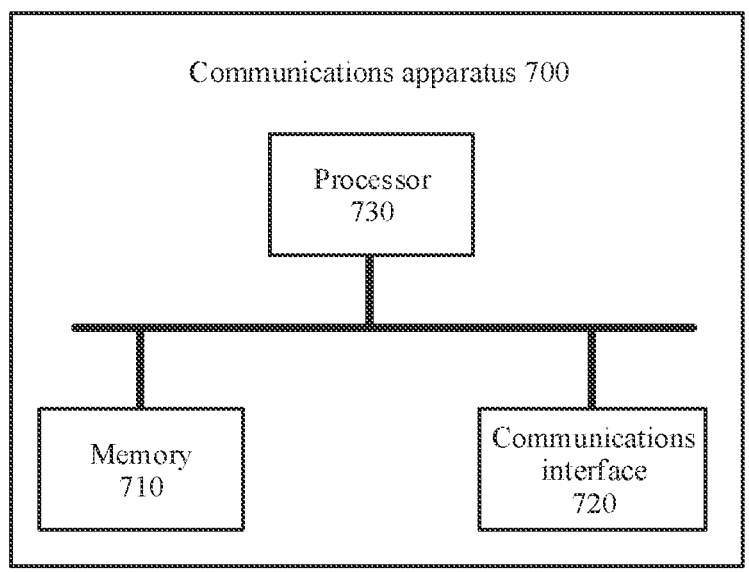
FIG. 7 is a schematic structural diagram of a communications apparatus according to another embodiment of this application.

FIG. 7 is a schematic block diagram of a communications apparatus 700 according to an embodiment of this application. It should be understood that the communications apparatus 700 can perform the steps performed by the network device in the method in FIG. 2. To avoid repetition, details are not described herein again. The communications apparatus 700 includes:

- a memory 710, configured to store a program;
- a communications interface 720, configured to communicate with another device;
- a processor 730, configured to perform the program in the memory 710, where when the program is performed, the processor 730 is configured to send DCI to a terminal device on a PDCCH, where the DCI includes first indication information, the first indication information is used to trigger the terminal device to send an SRS, and the DCI and/or higher layer signaling is further used to instruct to determine a first time interval in a plurality of candidate first time intervals corresponding to a first subcarrier spacing, where the first time interval is used to determine whether the first indication information is valid; the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing; and a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols; and
- a receiving unit, configured to receive the SRS from the terminal device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in another manner. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or in another form.

The units described as separate parts may or may not be physically separate, and parts displayed as units may or may not be physical units, may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending a sounding reference signal (SRS), comprising:
   receiving, by a terminal device, downlink control information (DCI) on a physical downlink control channel (PDCCH), wherein the DCI comprises first indication information, and wherein the first indication information is used to trigger the terminal device to send an SRS; and
   determining, by the terminal device and based on at least one of the DCI or higher layer signaling, a first time interval in a plurality of candidate first time intervals corresponding to a first subcarrier spacing, wherein the first time interval is used to determine whether the first indication information is valid, wherein the first subcarrier spacing comprises one of the following plurality of subcarrier spacings: a 15 kilohertz (kHz) subcarrier spacing, a 30 kHz subcarrier spacing, a 60 kHz subcarrier spacing, and a 120 kHz subcarrier spacing, and wherein a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, or a first time interval corresponding to the 120 kHz subcarrier spacing is less than or equal to 42 symbols.

2. The method according to claim 1, wherein the method further comprises:
   when a time interval between the last symbol of the PDCCH and a first symbol in which the SRS is located is greater than or equal to the first time interval, determining, by the terminal device, that the first indication information is valid; or
   when the time interval between the last symbol of the PDCCH and the first symbol in which the SRS is located is less than the first time interval, determining, by the terminal device, that the first indication information is invalid.

3. The method according to claim 1, wherein the first time interval meets one of the following conditions:
   the first time interval is less than or equal to a time interval between the last symbol of a physical downlink shared channel (PDSCH) indicated by the DCI and the first symbol of a first uplink channel, wherein the first uplink channel is used to carry hybrid automatic repeat request (HARQ) feedback information corresponding to the PDSCH indicated by the DCI, or
   the first time interval corresponding to the first subcarrier spacing is less than or equal to a time interval between the last symbol of the PDCCH and the first symbol of a first uplink channel, wherein the first uplink channel is used to carry a physical uplink shared channel (PUSCH) indicated by the DCI.

4. The method according to claim 1, wherein the first subcarrier spacing is a smaller value of a subcarrier spacing corresponding to the PDCCH and a subcarrier spacing corresponding to the SRS.

5. The method according to claim 3, wherein the determining, by the terminal device and based on at least one of the DCI or higher layer signaling, a first time interval in a plurality of candidate first time intervals corresponding to a first subcarrier spacing comprises:
   determining, by the terminal device, the first time interval when at least one of the following conditions is met:
   a time interval between a slot in which the PDSCH indicated by the DCI is located and a slot in which the HARQ feedback information is located is less than or equal to a first threshold;
   a time length of a time domain resource of the PDSCH indicated by the DCI is less than or equal to a second threshold;

a time length of a time domain resource of the PUSCH indicated by the DCI is less than or equal to a third threshold;
a time length of a time domain resource of the SRS is less than or equal to a fourth threshold; or
a quantity of a resource groups of the SRS is less than or equal to a fifth threshold.

6. The method according to claim 1, wherein the determining, by the terminal device and based on at least one of the DCI or higher layer signaling, a first time interval in a plurality of candidate first time intervals corresponding to a first subcarrier spacing comprises:
when a radio network temporary identifier (RNTI) used to scramble the DCI is a first RNTI, determining, by the terminal device, the first time interval, wherein modulation and coding scheme (MCS) information in the DCI scrambled by using the first RNTI corresponds to a first MCS table, and wherein the first MCS table comprises one piece of MCS information whose spectral efficiency is 0.0586.

7. An apparatus comprising:
one or more processors; and
a non-transitory computer readable medium storing a program to be executed by the one or more processors, wherein the program comprises instructions that cause the one or more processors to perform operations comprising:
sending downlink control information (DCI) to a terminal device on a physical downlink control channel (PDCCH), wherein the DCI comprises first indication information, wherein the first indication information is used to trigger the terminal device to send a sounding reference signal (SRS), wherein at least one of the DCI or higher layer signaling is further used to instruct the terminal device to determine a first time interval in a plurality of candidate first time intervals corresponding to a first subcarrier spacing, wherein the first time interval is used to determine whether the first indication information is valid, wherein the first subcarrier spacing comprises one of the following plurality of subcarrier spacings: a 15 kilohertz (kHz) subcarrier spacing, a 30 kHz subcarrier spacing, a 60 kHz subcarrier spacing, and a 120 kHz subcarrier spacing; and wherein a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, or a first time interval corresponding to the 120 kHz subcarrier spacing is less than or equal to 42 symbols; and
receiving the SRS from the terminal device.

8. The apparatus according to claim 7, wherein:
when a time interval between the last symbol of the PDCCH and the first symbol in which the SRS is located is greater than or equal to the first time interval, the first indication information is valid, and wherein when the time interval between the last symbol of the PDCCH and the first symbol in which the SRS is located is less than the first time interval, the first indication information is invalid.

9. The apparatus according to claim 7, wherein the operations further comprise: sending the higher layer signaling.

10. The apparatus according to claim 7, wherein the first time interval meets one of the following conditions:
the first time interval is less than or equal to a time interval between the last symbol of a physical downlink shared channel (PDSCH) indicated by the DCI and the first symbol of a first uplink channel, wherein the first uplink channel is used to carry hybrid automatic repeat request (HARQ) feedback information corresponding to the PDSCH indicated by the DCI, or
the first time interval is less than or equal to a time interval between the last symbol of the PDCCH and the first symbol of a first uplink channel, wherein the first uplink channel is used to carry a physical uplink shared channel (PUSCH) indicated by the DCI.

11. The apparatus according to claim 7, wherein the first subcarrier spacing is a smaller value of a subcarrier spacing corresponding to the PDCCH and a subcarrier spacing corresponding to the SRS.

12. The apparatus according to claim 7, wherein the operations further comprise:
scrambling the DCI by using a first radio network temporary identifier (RNTI), wherein the first RNTI corresponds to the first time interval, wherein modulation and coding scheme (MCS) information in the DCI scrambled by using the first RNTI corresponds to a first MCS table, and wherein the first MCS table comprises one piece of MCS information whose spectral efficiency is 0.0586.

13. An apparatus comprising:
one or more processors; and
a non-transitory computer readable medium storing a program to be executed by the one or more processors, wherein the program comprises instructions that cause the one or more processors to perform operations comprising:
receiving downlink control information (DCI) on a physical downlink control channel (PDCCH), wherein the DCI comprises first indication information, and wherein the first indication information is used to trigger a terminal device to send an sounding reference signal (SRS); and
determining, based on at least one of the DCI or higher layer signaling, a first time interval in a plurality of candidate first time intervals corresponding to a first subcarrier spacing, wherein the first time interval is used to determine whether the first indication information is valid, wherein the first subcarrier spacing comprises one of the following plurality of subcarrier spacings: a 15 kilohertz (kHz) subcarrier spacing, a 30 kHz subcarrier spacing, a 60 kHz subcarrier spacing, and a 120 kHz subcarrier spacing; and wherein a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, or a first time interval corresponding to the 120 kHz subcarrier spacing is less than or equal to 42 symbols.

14. The apparatus according to claim 13, wherein the operations further comprise:

when a time interval between the last symbol of the PDCCH and a first symbol in which the SRS is located is greater than or equal to the first time interval, determining that the first indication information is valid; or when the time interval between the last symbol of the PDCCH and the first symbol in which the SRS is located is less than the first time interval, determining that the first indication information is invalid.

15. The apparatus according to claim 13, wherein the first time interval meets one of the following conditions:

the first time interval is less than or equal to a time interval between the last symbol of a physical downlink shared channel (PDSCH) indicated by the DCI and the first symbol of a first uplink channel, wherein the first uplink channel is used to carry hybrid automatic repeat request (HARQ) feedback information corresponding to the PDSCH indicated by the DCI, or the first time interval corresponding to the first subcarrier spacing is less than or equal to a time interval between the last symbol of the PDCCH and the first symbol of a first uplink channel, wherein the first uplink channel is used to carry a physical uplink shared channel (PUSCH) indicated by the DCI.

16. The apparatus according to claim 13, wherein the first subcarrier spacing is a smaller value of a subcarrier spacing corresponding to the PDCCH and a subcarrier spacing corresponding to the SRS.

17. The apparatus according to claim 15, wherein the determining, based on at least one of the DCI or higher layer signaling, a first time interval in a plurality of candidate first time intervals corresponding to a first subcarrier spacing comprises:

determining the first time interval when at least one of the following conditions is met:

a time interval between a slot in which the PDSCH indicated by the DCI is located and a slot in which the HARQ feedback information is located is less than or equal to a first threshold;

a time length of a time domain resource of the PDSCH indicated by the DCI is less than or equal to a second threshold;

a time length of a time domain resource of the PUSCH indicated by the DCI is less than or equal to a third threshold;

a time length of a time domain resource of the SRS is less than or equal to a fourth threshold; or a quantity of a resource groups of the SRS is less than or equal to a fifth threshold.

18. The apparatus according to claim 13, wherein the determining, based on at least one of the DCI or higher layer signaling, a first time interval in a plurality of candidate first time intervals corresponding to a first subcarrier spacing comprises:

when a radio network temporary identifier (RNTI) used to scramble the DCI is a first RNTI, determining the first time interval, wherein modulation and coding scheme (MCS) information in the DCI scrambled by using the first RNTI corresponds to a first MCS table, and wherein the first MCS table comprises one piece of MCS information whose spectral efficiency is 0.0586.

* * * * *

UNITED STATES PATENT AND TRADEMARK OFFICE
CERTIFICATE OF CORRECTION

PATENT NO. : 11,818,066 B2
APPLICATION NO. : 17/172598
DATED : November 14, 2023
INVENTOR(S) : Jiafeng Shao and Yongxia Lyu It is certified that error appears in the above-identified patent and that said Letters Patent is hereby corrected as shown below:

In the Claims

Column 25, Line 61, Claim 8, please delete "the" and insert therefore -- a --.

Signed and Sealed this
Fourth Day of June, 2024

Katherine Kelly Vidal
*Director of the United States Patent and Trademark Office*